(12) United States Patent
Gast, Jr. et al.

(10) Patent No.: US 6,431,234 B1
(45) Date of Patent: *Aug. 13, 2002

(54) TIRE WITH SLOPED BLOCKS

(75) Inventors: George E. Gast, Jr., Fort Mill, SC (US); Kenneth J. Gormish, Charlotte; Gary Paul Zolton, Cornelius, both of NC (US); Henry Buel Edwards, II, Benton, KY (US)

(73) Assignee: Continental Tire North America, Inc., Charlotte, NC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/183,925

(22) Filed: Oct. 30, 1998

(51) Int. Cl.[7] .................. B60C 11/11; B60C 107/00
(52) U.S. Cl. .................. 152/209.15; 152/902
(58) Field of Search .............. 152/209.15, 209.28, 152/902; 451/254, 920

(56) References Cited

U.S. PATENT DOCUMENTS

| | | | |
|---|---|---|---|
| 1,128,387 A | * | 2/1915 | Tiefenbacher ........ 152/209.15 |
| 1,522,448 A | * | 1/1925 | Harig .................. 152/209.15 |
| 2,180,649 A | * | 11/1939 | White ................. 152/209.15 |
| 2,240,542 A | * | 5/1941 | Bourdon ............. 152/209.15 |
| 2,915,113 A | | 12/1959 | Van Sickle et al. |
| 3,724,137 A | * | 4/1973 | Hofelt |
| 3,739,533 A | | 6/1973 | Iida et al. |
| 3,932,965 A | | 1/1976 | Kline, Jr. |
| 3,946,527 A | | 3/1976 | Beer |
| 3,977,131 A | | 8/1976 | Searle et al. |
| 4,041,647 A | | 8/1977 | Ugo |
| 4,173,850 A | | 11/1979 | Gormish et al. |
| 4,736,546 A | | 4/1988 | Ugo |
| 5,099,613 A | * | 3/1992 | Rogers |
| 5,109,903 A | * | 5/1992 | Watanabe et al. ...... 152/209.15 |
| 5,185,960 A | | 2/1993 | Majerus et al. |
| 5,645,465 A | * | 7/1997 | Vannan |
| 5,733,793 A | * | 3/1998 | Hubbell et al. ........ 152/DIG. 3 |
| 5,820,796 A | * | 10/1998 | Howald et al. ............. 264/326 |
| 5,944,082 A | * | 8/1999 | Thompson et al. .... 152/209.23 |
| 5,960,845 A | * | 10/1999 | Wada .................... 152/209.23 |
| 6,086,452 A | * | 7/2000 | Lipczynski et al. |

FOREIGN PATENT DOCUMENTS

| | | | | |
|---|---|---|---|---|
| JP | 61-143206 | * | 6/1986 | ............ 152/209.15 |
| JP | 2-179508 | * | 7/1990 | ............ 152/209.15 |
| JP | 4-257706 | * | 9/1992 | ............ 152/209.15 |

* cited by examiner

Primary Examiner—Steven D. Maki
(74) Attorney, Agent, or Firm—Calfee, Halter & Griswold LLP (57) ABSTRACT

A method for directional force correction of pneumatic tires that simultaneously corrects radial and tangential force exerted by the tire. The method allows for the correction of tangential force regardless of the rotational direction of the tire. This invention accomplishes this end through an improved force correction technique, wherein at least two rotary grinders are employed. In the inventive method, the rotational direction of one grinder is reversed in relation to the rotational direction of the other grinder(s). Therefore, at least one grinder will engage the tire in an "up-grinding" manner, and at least one grinder will engage the tire in a "down-grinding" manner. The result is that across the width of the tire's tread surface, some tread blocks will have a "heel-to-toe" appearance, while others will appear "toe-to-heel." The effect is that, no matter what direction the tire is rotating while in use on an automobile, tangential force variation has been reduced.

4 Claims, 5 Drawing Sheets

TIRE WITH SLOPED BLOCKS

BACKGROUND OF THE INVENTION

Each year, vehicle vibration is among the most common source of new vehicle dissatisfaction. Any rotating component of a vehicle is potential excitation source for vibration, from brake rotors, the engine, driveline, wheels, tires, or even the highway surface itself. Generally, this invention relates to the use of a low speed tire uniformity machine to correct for the variation of the directional forces exerted by tires rotating against a wheel with constant deflection. This invention specifically relates to an improved method for optimizing tire uniformity, wherein a process for correcting radial force variation simultaneously reduces the directionally dependent tangential force variation caused by the uniformly sloped tread-blocks or "heel-to-toe" effect of conventional force correction techniques, thereby reducing the tangential force variation and improving the ride comfort of the tire.

Figure 8:
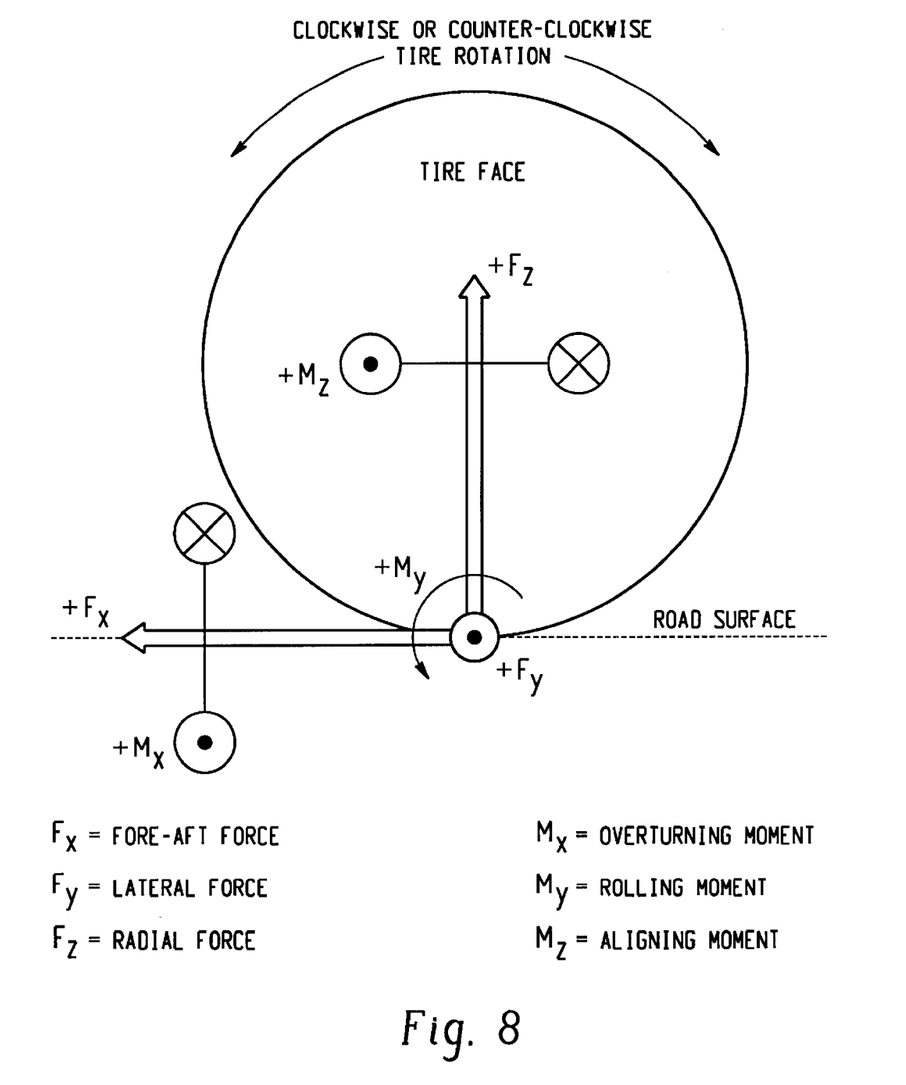
FIG. 8 is a depiction of the tire uniformity coordinate system typically used with low speed and highway speed uniformity machines.

FIG. 8 displays the tire uniformity coordinate system typically used in the tire industry for low and highway speed uniformity machines. The system illustrates the forces and moments generated by the tire as it rotates through the tire footprint or tread surface. Force variation produced by a tire rotating at constant deflection is broken down into three orthogonal forces referred to in industry literature as radial (Fz), lateral (Fy), and tangential (Fx). Radial force is the vertical force between the tire and the road surface, most typically the road across which the tire travels. Radial force is applied on an axis that is perpendicular to the road, and is in effect the "up and down" force acting upon a wheel's axle. Tangential or fore/aft force is the horizontal force between the tire and the road. The tangential axis is parallel to the road, in the direction of travel. It is on this axis that the tangential or driving force is applied. Tangential force is effectively the front-to-back force that acts upon the axle. Lateral force is the side-to-side force along the rotational axis between the tire and the road. The lateral axis is where side-to-side forces are applied by the tire, and this axis is parallel to the road surface, perpendicular to the direction of travel. That these three forces will be generated by a tire rotating against a load is a law of physics—they will always be present.

A goal of tire manufacturing is to eliminate or reduce any adverse effects that these forces may have on the ride of a tire, such as wheel hop or vibration. The mere existence of such forces does not create ride disturbance per se. For example, when the forces remain constant throughout the entire revolution of a tire, the tire's ride will be undisturbed. It is only when the forces vary throughout the course of a tire's revolution that ride disturbance is observed.

To illustrate this point, consider the force of gravity. Practically speaking, the earth's gravitational force is perpetual and constant in its magnitude. So while it is always acting upon every object on or near the earth's surface, it acts upon those objects in the same way at all times. In that sense, the force of gravity does not disturb the regular course of activity on earth. However, if the force of gravity were to change throughout the course of a day, activity on earth would be greatly disturbed. If the earth's gravity were to change, the weight of everything on earth would change as well. It is neither desirable nor possible to eliminate the force of gravity, but it is desirable that it remain constant. And so it is with the forces generated by tires. It is not the forces themselves that noticeably affect the ride of a tire, but the variation in force that is responsible for ride disturbance.

Force variation is generated by the rotation of a tire that is not uniform. Two primary tire deformities result in radial force variation: being "out of round" or slightly misshapen, and a variation in the tire's carcass stiffness. Carcass stiffness is the measure of a tire's resistance to flexing while revolving against a load. Resistance to flexing is simply another way of describing how much force the tire carcass is exerting against the road. Both of these deformities generate a vertical force component that disturbs the equilibrium of the wheel's axle and causes it to undergo an up and down movement during each revolution of the tire. This occurs on a tire that is out of round because some portions of the tread surface are simply farther away from the axle than others, therefore making the vertical distance between the axle and the road dependent upon which portion of the tread surface is making contact with the road. Similarly, a tire with a variable carcass stiffness will cause the axle to move up and down during the course of a rotation because some portion of the carcass will push less hard against the road than the remaining portion. If the variation in stiffness is great enough, the axle will be pushed farthest from the road when the stiffest portion of the carcass rotates across the road, and it will fall closer to the road when the most flexible portion of the carcass comes in contact with the road.

Generally, many of the deformities that cause radial force variation also cause tangential force variation. Tangential force variation is generated when the angular velocity of the tire changes throughout the course of its revolution. A change in angular velocity means that for a tire driven at constant rotational speed, some points on the tread surface of the tire are traveling at a faster linear speed than are others. This is easy to conceptualize for a tire that is out of round. In order to be out of round, some points on the tread surface must be farther away from the axle than are the others. That means that during the course of one rotation, the point farthest from the axle will travel a greater linear distance to complete its rotation than all of the other points, yet it will have done so in the same amount of time. Because speed equals distance traveled divided by time, the linear speed of the tire at the point farthest from the axle must be traveling faster than all of the other points. When that point makes contact with the road, the tire in effect pulls or accelerates the axle forward. However, as soon as that point passes the road, a slower point comes into contact with the road and acts to decelerate the axle or push it back. This pushing and pulling motion will occur once every rotation, resulting in ride disturbance. Variation in carcass stiffness will also cause this pushing and pulling effect because the least rigid portion of the tire will travel more slowly across the road than the rest of the tire.

Because many tire deformities are generally responsible for both radial and tangential force variation, it is logical that detecting and correcting the deformity would correct for both types of variation. Grinding is an effective technique for correcting tires that are either out of round or have variable carcass stiffness. A tire that is out of round can be ground so that it is uniform. Grinding can also make carcass stiffness more uniform. If carcass stiffness is thought of as the spring force of the tire, then the goal is to make the force a constant. A spring's force or potential is the product of its length and its spring coefficient, which is a constant unique to that spring. If each point on a tire's tread surface is thought of as a spring from that point to the axle, then the spring force would be the product of the length of that spring and its coefficient. If the spring lengths are not uniform, the tire is obviously out of round, and grinding can remedy this.

If the tire is uniformly circular, but of variable carcass stiffness, then the variance is in the spring coefficients. Because a spring's coefficient is constant, and the goal is to make the spring's force constant, the only factor than can be corrected for is spring length. Grinding minute amounts of rubber at those points of greatest spring force will reduce the spring length and serve to make the tire more uniform without taking it so far out of round as to create ride disturbance.

Although correcting for radial force variation should also theoretically correct for tangential force variation, separate detection and correction techniques for each are known in the art. It is desirable from a production standpoint to accomplish both corrections by employing only one technique, saving the manufacturer both time and money. Due to the realities of tire manufacture, it is optimal that this dual force correction be accomplished through the detection and correction of radial force variation. Radial force variations generally exist independent of the speed of tire rotation, and force correction is typically done at very slow speeds, such as 60 rpm. Low speed uniformity machines are used for the radial force detection and correction process, and are relatively inexpensive and in widespread use in the industry. Conversely, tangential force variation is speed-dependent, and generally cannot be detected at 60 rpm. The machine used to test and correct tangential force variation must be capable of rotating a tire at speeds of at least 300 rpm, and preferably 800 rpm or more. These highway speed uniformity machines are extremely expensive and are not commonly used in the commercial manufacture of tires. It is therefore desirable to be able to eliminate tangential force variation simultaneously with correction of radial force through employment of the low speed uniformity machine.

A known tire uniformity machine utilized to correct for radial force variation and its operation is described as follows: A motor drives a wheel to which a tire will be mounted. The tire is rotated against a free rotating load drum, which is connected to force transducers, which feed information into a computer. The computer directs grinding wheels to engage the tire. The grinding wheels are driven by motors which are attached to amp meters, which measure the load on the motors. Typically, the radial force correction process occurs as follows: a tire is mounted on a precision chuck, inflated to a test pressure, and rotated under a predetermined load against a loading drum. Radial force and radial force variation are then measured on the loading drum by force transducers located in the radial direction on the axis of the loading drum. A pair of rotary grinders positioned adjacent the shoulders of the tire tread are next moved into grinding engagement with the tread shoulder ribs. The grinders are moved into the tire to remove rubber at high force locations. Minute quantities of rubber are ground from the shoulders of the tire. The grinding results in a more uniform tire with reduced radial force variation.

Figure 2:
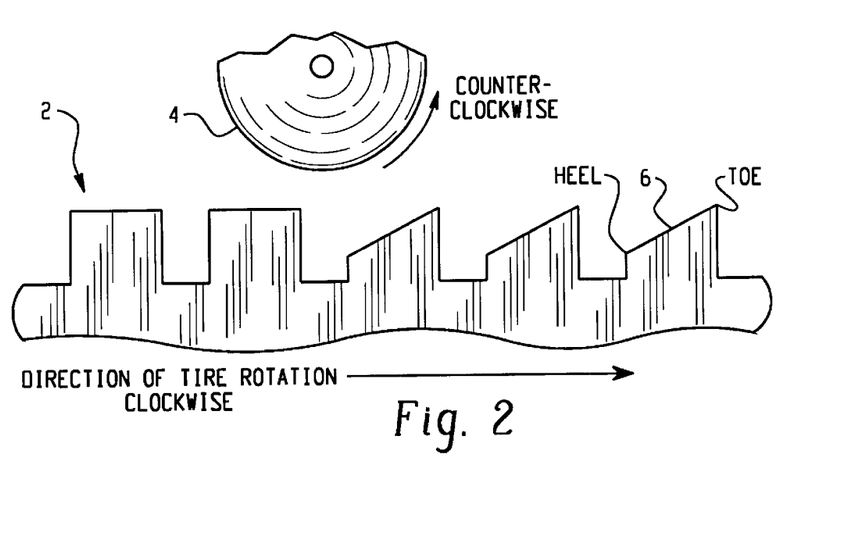
FIG. 2 is a diagrammic view of a tire being engaged by grinding wheels in a "down-grinding" manner, and the resultant "heel-to-toe" profile of the ground tread-blocks, as seen from the outer wall of the tire.
Figure 3:
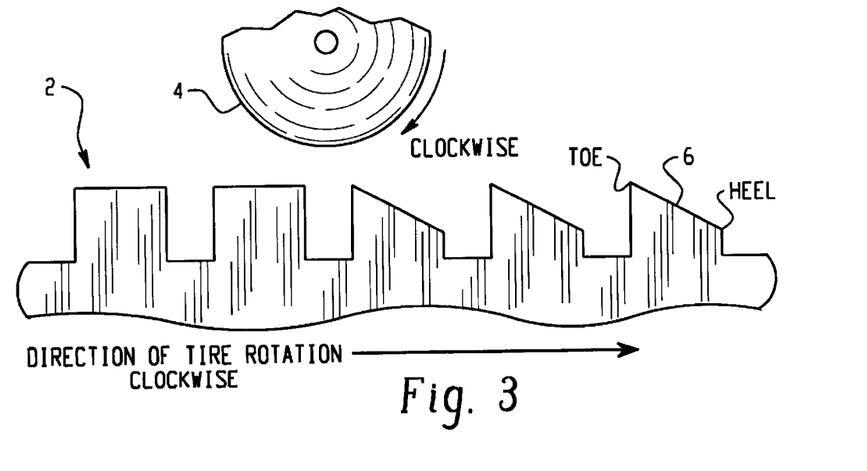
FIG. 3 is a diagrammic view of a tire being engaged by grinding wheels in an "up-grinding" manner, and the resultant "toe-to-heel" profile of the ground tread-blocks, as seen from the outer wall of the tire.

In this conventional process, the grinders are typically driven in the same rotational direction relative to each other. The grinders may engage the tire in either a "down-grinding" or ",up-grinding" manner, depending on the rotational direction of the grinders relative to that of the tire. "Down-grinding" is depicted in FIG. 2, and it occurs where the rotational direction of the grinding wheels is opposite to that of the tire, but at the interface of the tire and grinder surfaces, the surfaces are moving in the same linear direction. For each tread-block ground by the down-grinding process, the depth of grinding engagement will increase from the point of first contact. FIG. 3 illustrates the process of "up-grinding," which occurs where the rotational direction of the grinders is the same as that of the tire, but at their interface, the surfaces of the tire and the grinders are moving in opposite linear directions. The depth of grinding engagement by this method is deepest at the point of first contact between the grinder and the tread-block. Both methods of grinding engagement create uniformly sloping tread-blocks across the shoulders of the tire, the orientation of the slope being the primary distinction between the methods. The sloped appearance of the tread-blocks is described as "heel-to-toe" or "toe-to-heel," depending upon the orientation of the slope. Grinder rotation relative to that of the tire dictates the slope.

Figure 1:
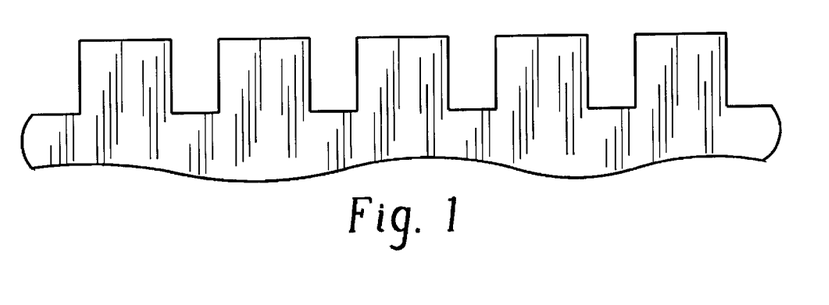
FIG. 1 is a profile view of a series of unground tread-blocks, as seen from the outer wall of a tire.

FIG. 1 illustrates a typical profile of tread-blocks of an unground tire. When viewed from this perspective, the tread surface is flat, or has no slope. In the context of this specification and these claims, slope is defined as it would be in a Cartesian coordinate system. Slope equals the change in the vertical component of a line or plane over the change in the horizontal component of the same line or plane. Referring to the tread-blocks of FIG. 1, the vertical component of the blocks never changes, and therefore the slope is zero. FIG. 2 illustrates a tire subject to radial force variation correction wherein the tire 2 is rotated in the clockwise direction during the correction process. The grinder 4 shown is rotating in the counter-clockwise direction, thereby engaging the tire in a "down-cutting" manner. As shown, the resultant tread-blocks appear ",heel-to-toe," or have a positive slope 6. FIG. 3 illustrates the effect upon the tread-blocks 6 when the rotational direction of the grinding wheel in FIG. 2 is reversed. Here, the grinding wheel is engaging the tire in an "up-cutting" manner, and the resultant tread-blocks appear "toeto-heel.", Because the vertical component of the tread-block is decreasing as the horizontal component increases, the slope is negative.

The radial force correction method described above effectively serves its purpose of significantly reducing or eliminating radial force variation. However, this technique does not always satisfy its theoretical potential of reducing or eliminating tangential force variation. In fact, in most cases this method has been shown to be directly responsible for an increase in tangential force variation. It was discovered that when tires force corrected by the known radial force method described above were tested for tangential force variation on a highway speed uniformity machine, the tires generated less tangential force variation than unground tires when rotating in one direction, but more tangential force variation when rotated in the other direction. Practically speaking, because tires on opposite sides of an automobile rotate in opposite directions, half of the tires corrected by the above process would have reduced tangential force variation, while those on the other side would exert increased tangential force variation. It was further discovered that the uniform tread-block profiles as depicted in FIGS. 2 and 3 were directly responsible for this result.

Most tires are designed to be interchangeable, and therefore uniform to each other. The surest way of achieving interchangeability and uniformity is to manufacture and force correct each tire in an identical fashion. However, with four identically manufactured and radial force corrected tires it can be observed that the tires on one side of the automobile will exert significant tangential force variation while those on the other side will not. Although the tires are all identical as they emerge from the manufacturing and correction process, one thing changes when the tires are mounted on an automobile—when tires with identical heel-to-toe profiles are mounted on opposing sides of an automobile, their heel-to-toe profiles reverse in relation to each other.

Therefore, when the tires on one side rotate heel-to-toe, the others will rotate toe-to-heel. To remedy this situation, a manufacturer would have to correct half of its tires by up-grinding, and the other half by down-grinding, assuming the direction of tire rotation was kept constant. This is not desirable because it requires the time and expense of setting up a production line accordingly, and requires that the tires be sold to be mounted only on a specific side of an automobile.

The known methods for force correction result in the uniformly sloped tread-blocks as shown in FIGS. 2 and 3. The sloped tread-blocks serve to either significantly reduce or increase the tangential force variation upon the tire, depending on the rotational direction of the tire. A tire rotating in the "heel-to-toe" direction has been shown to exert low tangential force variation or at least reduced variation compared to that of an unground tire, because it travels more smoothly across the road surface than the unground portion of the tire. By contrast, a tire rotating "toe-to-heel" has been shown to exert significantly higher levels of tangential force variation, because it does not travel as smoothly as the unground portion of the tire. This is significant because force pulses are created as each tread block, ground or unground, passes over the road surface. These pulses can serve as an excitation source of the fore/aft torsional resonance of the vehicle. When this resonance is excited, the tangential or fore/aft force variation is observed. When the grind is in the same direction on the inside and outside shoulder ribs, the pulses add constructively, providing a potential excitation source for nearly all of the fore/aft torsional resonance frequencies, with nearly equal magnitudes.

On any passenger automobile, the tires on the left side (the driver side in the United States) of a forward moving vehicle rotate counter-clockwise (when viewed from the left side), and the tires on the right side rotate clockwise (when viewed from the right side). When tires are force corrected in the same manner, they have identical tread-slope orientations. However, when mounted on an automobile, the tread-slope orientation on one side of the vehicle will be reversed in respect to that of the tires on the other side. Therefore, the tires one side rotate "heel-to-toe", and experience little or no tangential force variation, while the tires on the other side will rotate "toe-to-heel" and be subject to unacceptably high levels of tangential force variation. For example, a tire corrected by the process depicted in FIG. 2 will rotate heel-to-toe when mounted on the left side of an automobile moving forward, and will rotate toe-to-heel when mounted on the right side. The tires on the right side will generate significant tangential force variation, whereas those on the left side will not. By contrast, tires corrected by the process depicted in FIG. 3 will do exactly the opposite. They will rotate heel-to-toe on the right side and toe-to-heel on the left. The tires on the left side will now generate the tangential force variation.

SUMMARY OF THE INVENTION

The object of the present invention is to provide for correction of radial force variation while simultaneously reducing tangential or fore/aft force variation, regardless of the rotational direction of the tire. This invention accomplishes this purpose through an improved force correction technique, wherein at least two rotary grinders are employed. In the inventive method, the rotational direction of one grinder is reversed in relation to the rotational direction of the other grinder(s). Therefore, at least one grinder will engage the tire in an "up-grinding" manner, and at least one grinder will engage the tire in a "down-grinding" manner. Furthermore, the tire may be engaged with greater pressure from the "down-grinding" grinder(s). The result is that across the width of the tire's tread surface, some tread blocks will have a "heel-to-toe" appearance, while others will appear "toe-to-heel." The effect is that, no matter what direction the tire is rotating while in use on an automobile, tangential force variation has been reduced.

DETAILED DESCRIPTION OF THE INVENTION

Figure 4:
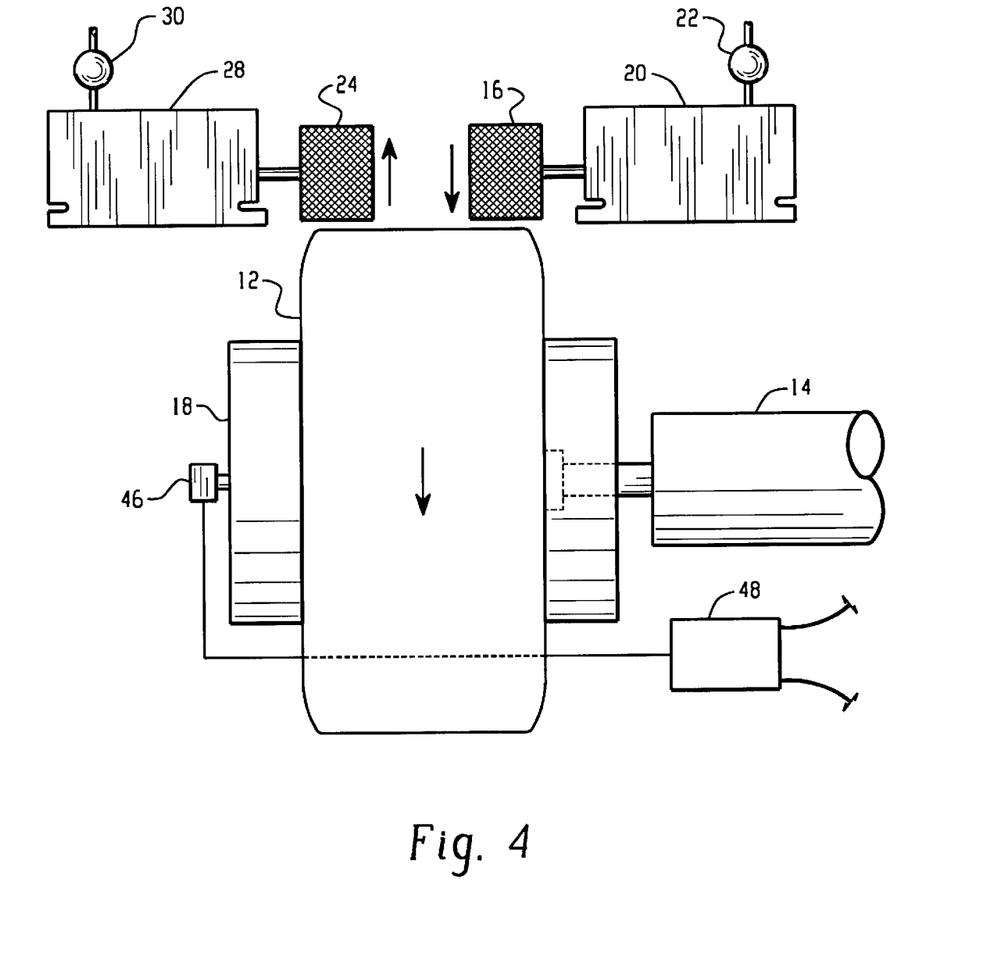
FIG. 4 is a schematic diagram of a tire being engaged by grinding wheels in the practice of the invention.

FIG. 4 illustrates one embodiment of the invention. Shown is a tire uniformity machine which is comprised of a motor 14 which drives a tire 12 against a load wheel 18. Connected to the load wheel is a force transducer 46 which is in turn connected to a computer 48. The computer commands grinder motors 20 and 28 to driving grinding wheels 16 and 24. Also attached to the grinder motors are amp meters 22 and 30. In the practice of the invention as shown in FIG. 4, the tire 12 as shown is rotated in the clockwise direction, and grinding wheels 16 and 24 are rotated clockwise and counter-clockwise, respectively. Grinding wheel 16 is rotating in the same direction as the tire, and the other grinding wheel 24, is rotating in the opposite direction. The grinding wheels are driven by grinder motors 20, 28, and the load on the grinder motors is measured by amp meters 22, 30. The load on the grinder motors is indicative of the relative pressures with which the grinding wheels engage the tire. Pressure is directly proportional to the load on the grinder motors. Therefore, the greater the pressure applied to the tire, the greater the load on the grinder motor. As the pressure on the tire and the load on the motor increase, so does the depth of the grind.

In FIG. 4, grinding wheel 16 is engaging the tire in an up-grinding manner. Grinding wheel 24 is engaging the tire in a down-grinding manner. In the embodiment of the invention shown in FIG. 4, the load on the down-grinding wheel's motor 28 should be greater than that on the motor of the up-grinding wheel 20. In other words, the pressure applied to the tire by the down-grinding wheel should be greater than the pressure applied by the up-grinding wheel.

Ideally, the load on the up-grinding motor is in the range of 60 to 80% of the down-grinding motor.

Figure 6:
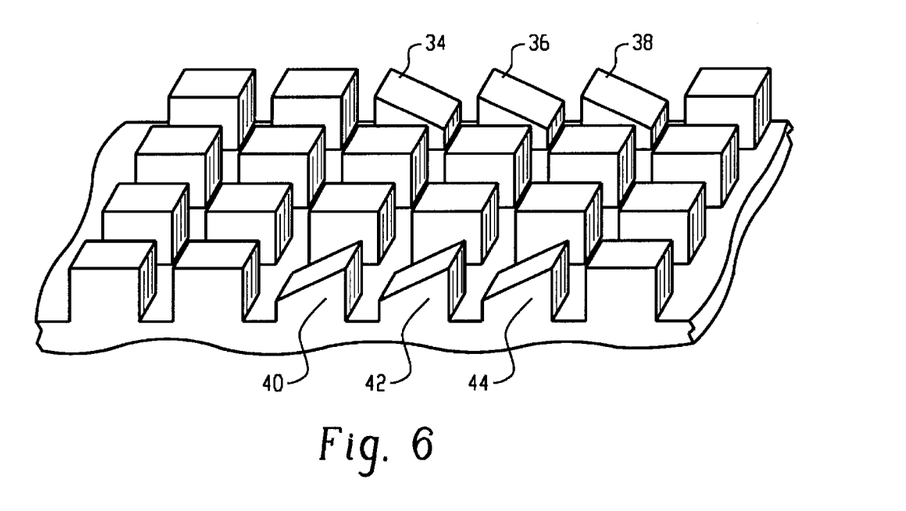
FIG. 6 is a profile view of the width of a tread surface of a tire showing tread-blocks displaying both "heel-to-toe" and "toe-to-heel" slopes, as seen from the outer wall of the tire.

FIG. 6 illustrates the tread profile of a tire after having been force corrected by the process depicted in FIG. 4. Tread-blocks 34,36,38 represent the shoulder of the tire corrected by the up-grinding wheel. From this view of tread-blocks 34,36,38, they have been ground so that their slope is negative, or "toe-to-heel" from left to right. Tread-blocks 40, 42, 44 represent the shoulder of the tire ground by the down-grinding wheel. From this view of tread-blocks 40, 42, 44, they have been ground so that their slope is positive, or "heel-to-toe" from left to right.

Every tire corrected by this process will always have one shoulder rotating heel-to-toe and one shoulder rotating toe-to-heel, regardless of the tire's rotational direction. Therefore, when grinding to correct for radial force variation by this method, no significant tangential force variation will be created in the process. Each tire will be uniform in its own rotation, and will also be uniform in relation to the other tires with which it will be utilized on an automobile. The result is greater ride comfort.

Figure 5:
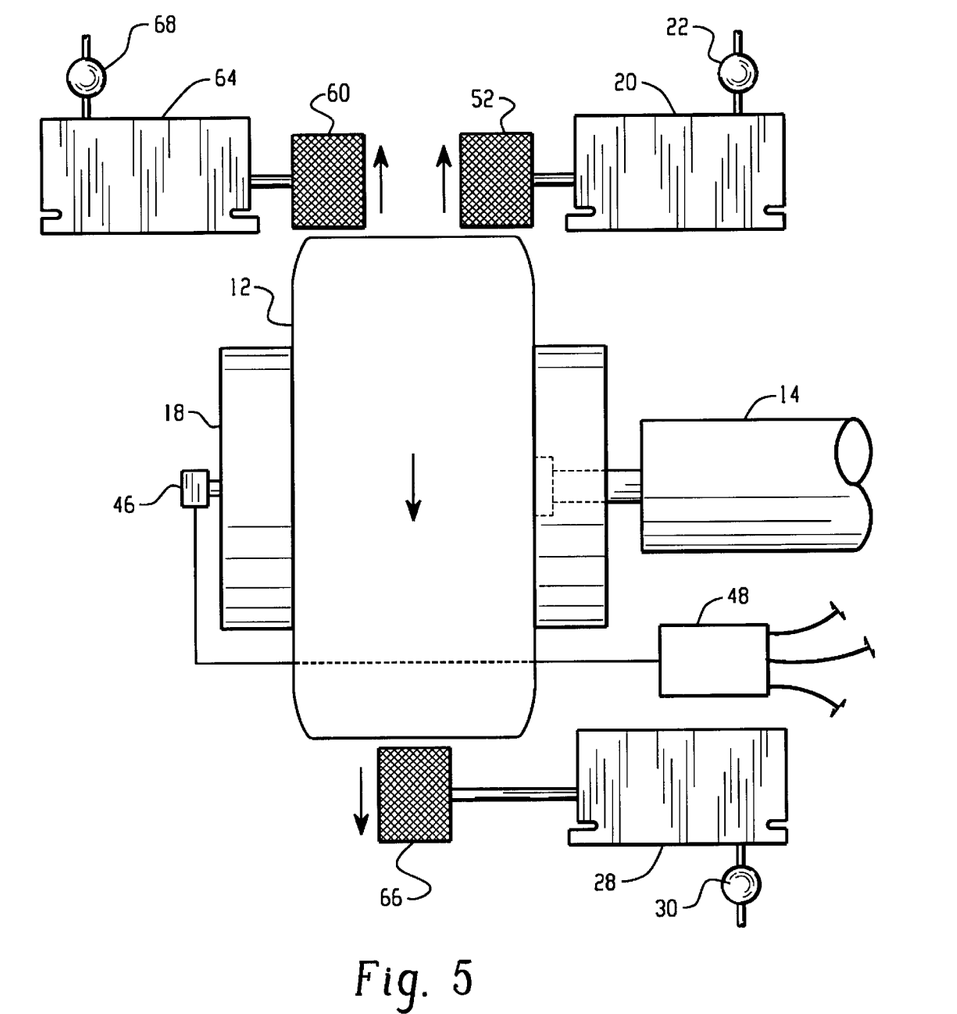
FIG. 5 is a schematic diagram of a tire being engaged by grinding wheels in the practice of the invention.

FIG. 5 illustrates another embodiment of the applicant's invention. Grinding wheels 52 and 60 are positioned on the shoulders of the tire 12 and are driven in the same rotational direction relative to each other. Grinding wheel 66 is positioned in the center of the tread surface, and is driven in the opposite rotational direction of grinding wheels 52 and 60. In this configuration as shown, grinding wheel 66 is the up-grinding wheel, and more pressure should be applied by it to the tire than the pressure applied by grinding wheels 52 and 60, contrary to the invention as depicted in FIG. 4. In fact, in practicing the invention where the two shoulder grinding wheels are rotating identically and the center grinding wheel is rotating in the opposite direction, the pressure applied by the center grinder should always be greater. Ideally in the configuration of FIG. 5, the load on the down-grinding motors is 30 to 70% of the up-grinding motor. It has also been realized that a +/−40% variation in the relative differential between the amperages produces similar results. In any embodiment of the invention, the pressure differential on the grinding wheels should be governed by the goal of grinding the tread blocks so that the pulses generated by the heel-to-toe and toe-to-heel portions of the tread surface are equal and opposite, resulting in destructive interference which reduces tangential force variation.

Figure 7:
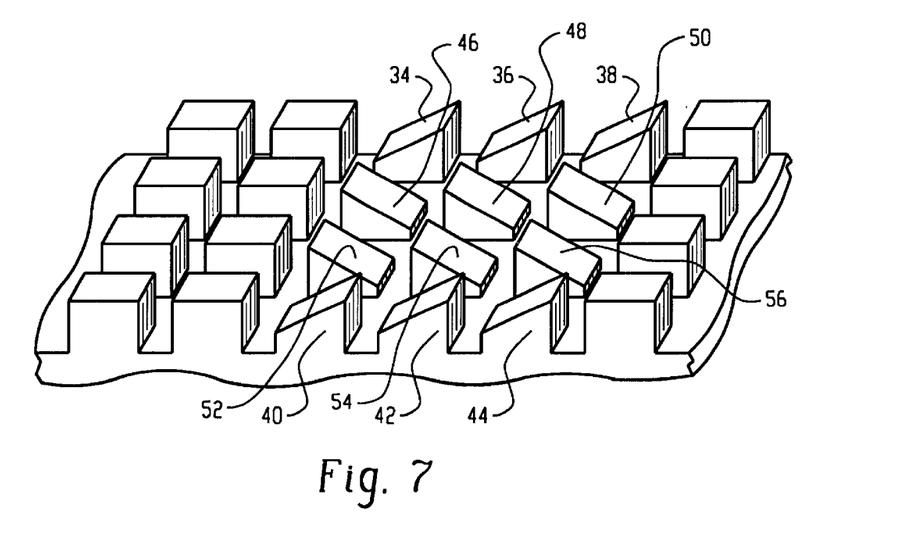
FIG. 7 is a tire block element description of the "toe-to-heel" effect on the shoulder ribs due to the two grinding wheels rotating in the same direction and the "heel-to-toe" effect on the center ribs due to the additional center rib grinder rotating in the opposite direction to the shoulder grinders in the practice of the invention.

A tire ground by the above process will have shoulders with identical heel-to-toe orientation, while the center tread-blocks will have the opposite heel-to-toe orientation, as shown in FIG. 7. Tread blocks 34,36,38,40,42, and 44 were all corrected by down-grinding, and their slope is positive. Tread blocks 46,48,50,52,54 and 56 were corrected by up-grinding, and their slope is negative. The result is a tire which will have heel-to-toe and toe-to-heel rotational components regardless of the tire's rotational direction. Such tires will have reduced tangential force variation and will provide greater ride comfort.

While certain representative embodiments and details have been shown for the purpose of illustrating the invention, it will be apparent to those skilled in the art that various changes and modifications may be made therein without departing from the spirit or scope of the invention.

What is claimed is:

1. A tire comprising:
   a tread surface defining a circumference of the tire and exerting a tangential force and a radial force when it contacts a road during a rotation of the tire, the tread surface including a first shoulder and a second shoulder, the first shoulder and the second shoulder each including tread blocks, each of the tread blocks including a road-contacting surface having leading and trailing edges;

the entire road-contacting surface of at least one of the tread blocks on the first shoulder has a slope from its leading edge to its trailing edge in only a fist direction;

the entire road-contacting surface of at least one of the tread blocks on the second shoulder has a slope from its leading edge to its trailing edge in only a second direction which is opposite the first direction;

each slope is uniformly inclined between the leading and trailing edges;

the tangential force exerted by the tread surface as it contacts a road during a rotation of the tire is uniform around the circumference of the tire; and the radial force exerted by the tread surface as it contacts a road during a rotation of the tire is uniform around the circumference of the tire.

2. The tire of claim 1,
   wherein all of the tread blocks on the first shoulder are sloped in the first direction; and
   wherein all of the tread blocks on the second shoulder are sloped in the second direction.

3. A tire comprising:
   a tread surface defining a circumference of the tire and exerting a tangential force and a radial force when it contacts a road during a rotation of the tire, the tread surface including a first shoulder, a second shoulder, and a center, the first shoulder and the second shoulder and the center including tread blocks;

each of the tread blocks including a road-contacting surface having leading and trailing edges;

the entire road-contacting surface of at least one of the tread blocks on the first shoulder has a slope from its leading edge to its trailing edge in only a first direction;

the entire road-contacting surface of at least one of the tread blocks on the second shoulder has a slope from its leading edge to its trailing edge in only the first direction;

the entire road-contacting surface of at least one of the tread blocks on the center has a slope from its leading edge to its trailing edge in only a second direction which is opposite the first direction;

each slope is uniformly inclined between the leading and trailing edges; the tangential force exerted by the tread surface as it contacts a road during a rotation of the tire is uniform around the circumference of the tire; and the radial force exerted by the tread surface as it contacts a road during a rotation of the tire is uniform around the circumference of the tire.

4. The tire of claim 3,
   wherein all of the tread blocks on the first shoulder are sloped in the first direction;
   wherein all of the tread blocks on the second shoulder are sloped in the first direction; and
   wherein all of the tread blocks on the center are sloped in the second direction.

* * * * *

UNITED STATES PATENT AND TRADEMARK OFFICE
CERTIFICATE OF CORRECTION

PATENT NO.     : 6,431,234 B1
DATED          : August 13, 2002
INVENTOR(S)    : Gast, Jr. et al.

It is certified that error appears in the above-identified patent and that said Letters Patent is hereby corrected as shown below:

Column 8,
Line 7, please delete "fist" and insert -- first --.

Signed and Sealed this

First Day of July, 2003

JAMES E. ROGAN
*Director of the United States Patent and Trademark Office*